United States Patent
Sprenger et al.

(10) Patent No.: US 10,574,663 B2
(45) Date of Patent: Feb. 25, 2020

(54) METHOD FOR OPERATING A FIELD DEVICE

(71) Applicant: Endress+Hauser Process Solutions AG, Reinach (CH)

(72) Inventors: Johannes Sprenger, Lörrach (DE); Thomas Jögel, Immenstadt (DE); Holger Eberhard, Stuttgart (DE); Marco Colucci, Lörrach (DE)

(73) Assignee: Endress+Hauser Process Solutions AG, Reinach (CH)

( * ) Notice: Subject to any disclaimer, the term of this patent is extended or adjusted under 35 U.S.C. 154(b) by 124 days.

(21) Appl. No.: 15/421,327

(22) PCT Filed: Jul. 16, 2015

(86) PCT No.: PCT/EP2015/066261
§ 371 (c)(1),
(2) Date: Apr. 24, 2017

(87) PCT Pub. No.: WO2016/020165
PCT Pub. Date: Feb. 11, 2016

(65) Prior Publication Data
US 2017/0257378 A1  Sep. 7, 2017

(30) Foreign Application Priority Data

Aug. 4, 2014 (DE) .................. 10 2014 111 046

(51) Int. Cl.
*H04L 29/06* (2006.01)
*G06F 21/31* (2013.01)
(Continued)

(52) U.S. Cl.
CPC ........ *H04L 63/105* (2013.01); *G05B 19/4183* (2013.01); *G06F 21/31* (2013.01);
(Continued)

(58) Field of Classification Search
CPC . H04L 4/10; H04L 4/08; H04L 4/0861; H04L 4/102; H04W 12/08; G06F 21/31; G06F 21/54; G05B 19/042; G05B 19/4183
See application file for complete search history.

(56) References Cited

U.S. PATENT DOCUMENTS 7,403,765 B2 * 7/2008 Miyashita ............... H04M 1/67
455/410
9,270,653 B2 * 2/2016 Maria ..................... H04L 63/08
(Continued)

FOREIGN PATENT DOCUMENTS

DE       10315526 A1   10/2004
DE    102005014050 A1    9/2006
(Continued)

OTHER PUBLICATIONS

Search Report for German Patent Application No. 10 2014 111 046.3, German Patent Office, dated Apr. 27, 2015, 8 pp.
(Continued)

*Primary Examiner* — Khalil Naghdali
*Assistant Examiner* — Shaqueal D Wade
(74) *Attorney, Agent, or Firm* — Kelly J. Smith; PatServe

(57) ABSTRACT

A method for operating a field device is disclosed, the field device having settings and/or functions classified into different security levels, where one of the settings and/or functions of the field device is selected by a user, at least one security measure is implemented depending upon the security level with which the selected setting and/or function is associated, and the security measure determines whether the selected setting and/or function of the field device is released for the user.

16 Claims, 2 Drawing Sheets

(51) Int. Cl.
  *G05B 19/418* (2006.01)
  *H04W 12/08* (2009.01)
  *H04W 12/06* (2009.01)

(52) U.S. Cl.
  CPC ......... *H04L 63/0861* (2013.01); *H04W 12/08* (2013.01); *G05B 2219/25428* (2013.01); *G06F 2221/2113* (2013.01); *G06F 2221/2149* (2013.01); *G07C 2209/04* (2013.01); *H04L 2463/082* (2013.01); *H04W 12/06* (2013.01); *Y02P 90/10* (2015.11)

(56) References Cited

U.S. PATENT DOCUMENTS

| | | | |
|---|---|---|---|
| 2003/0054800 | A1 | 3/2003 | Miyashita |
| 2008/0201582 | A1* | 8/2008 | Jachmann ........... G05B 19/0426 713/300 |
| 2009/0065578 | A1 | 3/2009 | Peterson et al. |
| 2013/0076482 | A1 | 3/2013 | Wan |
| 2013/0257758 | A1* | 10/2013 | Huang .................... G06F 3/041 345/173 |
| 2013/0307667 | A1 | 11/2013 | Yang et al. |
| 2015/0018996 | A1* | 1/2015 | Furihata ............... G05B 19/042 700/108 |
| 2015/0186710 | A1* | 7/2015 | Ahn ................... G06K 9/00087 382/124 |

FOREIGN PATENT DOCUMENTS

| | | | |
|---|---|---|---|
| DE | 112011105594 T5 | 7/2014 | |
| DE | 102014111046 A1 | 2/2016 | |
| KR | 20150080736 A * | 7/2015 | ......... G06K 9/00087 |
| WO | 2004049239 A1 | 6/2004 | |
| WO | 2006125404 A1 | 11/2006 | |
| WO | 2010000276 A1 | 1/2010 | |
| WO | 2016020165 A1 | 2/2016 | |

OTHER PUBLICATIONS

International Search Report for PCT Application No. PCT/EP2015/066261, WIPO, dated Sep. 15, 2015, 10 pp.

* cited by examiner

METHOD FOR OPERATING A FIELD DEVICE

CROSS-REFERENCE TO RELATED APPLICATIONS

The present application is related to and claims the priority benefit of PCT Application No. PCT/EP2015/066261, filed on Jul. 16, 2015, and German Patent Application No. 10 2014 111 046.3, filed on Aug. 4, 2014, the entire contents of which are incorporated herein by reference.

TECHNICAL FIELD

The present disclosure relates to a method for operating a field device and to an arrangement comprising a field device and an operator device, as well as to a computer program product.

BACKGROUND

A method for authorizing a user in order to obtain access to a restricted area has become known from the disclosure document WO 2010/000276 A1. Biometric data of the user are thereby detected and compared with stored data. A corresponding authorization for the user is subsequently transmitted to a wireless operator device and, via this operator device, to a control unit that serves to administer access to the restricted area.

In addition to this, nowadays there are a variety of mobile end devices, e.g., smartphones and other handheld operator devices, on which applications run that may connect with field devices in order to configure these or read out diagnostic information. These operator devices, or the applications on them, have security procedures in order to establish a secure connection with the field device.

Current security procedures for access control occasionally require complicated and time-consuming inputs by the user in order to achieve access to the field device.

Other methods that are used nowadays use keys for authentication, but these do not also incorporate information from the environment of the field device or of the operator device, for example, with regard to the user. However, the physical proximity between authorized user and operator device is of crucial relevance in industrial facilities.

SUMMARY

The present disclosure is based upon the object of specifying an access control for access to one or more field devices in a facility, in particular, a scalable access control.

The object is achieved according to the present disclosure by a method, an arrangement, and a computer program product.

With regard to the method, the object is achieved via a method for operating a field device, which field device has settings and/or functions that are classified into different security levels, wherein one of the settings and/or functions of the field device is selected by a user, wherein at least one security measure is implemented, depending upon the security level with which the selected setting and/or function is associated, wherein whether the selected setting and/or function is released for the user is determined via the security measure.

For example, the settings may be one or more parameters of the field device. These parameters may serve to set the functionality or the execution of one or more functions of the field device, for example, to set the measurement value calculation. For example, a function may be a specific function for measurement value calculation (for example, using a specific algorithm) or be a function for determining a status of the field device (for example, a diagnosis function). What can thus be understood by "operation" is the manipulation of a setting or the invocation of a function of the field device.

The proximity of a user to the field device or mobile end device can be easily validated via the proposed method, which is based upon, for example, biometric features or characteristics. This represents an advantage relative to exclusively key-based methods. The security level is then defined there via the selection of the encryption algorithm, the key length, or the password length. In addition to this, via the proposed method it may be checked (for example, via the detection of biometric features) whether the user is present, i.e., in physical proximity of the control device. A physical, secure, and, if applicable, authenticated connection to the field device may thus be provided to the user, which enables an adjustment to the field device to be made or a function of the field device to be executed.

In one embodiment of the method, a first number of security measures are executed in the event that a first setting and/or function that belongs to a first security level is selected, and where a second number of security measures are implemented in the event that a second setting and/or function that belongs to a second security level is selected, where the second number exceeds the first number. The second security level is thereby, for example, higher than the first security level, because a higher number of security measures are implemented.

The first or second security measure may thereby be one or more of the following security measures: detection of biometric features of the palm and/or back of the hand; detection of biometric features of the ear; detection of security information stored in a badge of the user, e.g., of a key, such as via a near field communication such as RFID or NFD; detection of a barcode or a QR code; repeated execution of the first security measure such that the number of features of a biometric characteristic that are detected is increased; detection of movements of the user on a touch display, which movements follow a predetermined curve, for example, provided by the indication of a hand template on the display, including simultaneous detection of a biometric characteristic, e.g., of a fingerprint of the user; and detection of a speech sample of the user.

The combination of the cited security measures or additional security measures increases the security and enables a scalable security system to be provided. A defined number of security measures may thus be executed depending upon the security level, which, for example, is established using the hazard potential of a setting and/or function.

According to one embodiment of the disclosed method, a user may thus calibrate a field device or otherwise invoke functions and make adjustments, for example, by means of an application such as FieldCare. An authentication and/or authorization of the user may then take place via one security measure or a combination of multiple security measures, e.g., the aforementioned security measures. The identity of the user may thus be determined via, for example, the detection of biometric features, and the authorization of the user may be checked via security information (stored on a badge, for example), which includes an authorization to execute one or more specific service tasks.

In at least one embodiment of the method, it is established via a first security measure whether a user is present. For this purpose, a simple swipe gesture, for example, may be used, or the user must execute a predetermined gesture along a predetermined curve on a touch display of the operator device, for example.

The at least one security measure may be executed only on the operator device, for example.

In a further embodiment of the method, a first number of biometric features that serve as a first identifier to identify the user are detected via a first security measure.

In a further embodiment of the method, a second number of biometric features that serve as a second identifier for identifying the user are detected via a second security measure. The second number of biometric features may thereby be larger than the first number of biometric features. For example, more features of a fingerprint may be detected for this purpose, which in fact requires more time or computing power, but then determines the identity of the user with greater probability.

In a further embodiment of the method, using the first and/or second security measure—in particular, using the first and/or second identifier—it is determined whether the selected setting and/or function is released for the user.

In a further embodiment of the method, the second security measure is executed instead of the first security measure in the event that the selected function belongs to a second security level that is higher than the first security level, to which belongs at least one other setting and/or function of the field device.

In a further embodiment of the method, the second security measure is executed in addition to the first security measure in the event that the selected function belongs to a second security level that is higher than the first security level, to which belongs at least one other setting and/or function of the field device.

In a further embodiment of the method, the detected first and/or second identifier is compared with a first and/or second identifier (stored in the field device or an operator device, for example) serving as a reference, and the selected function of the field device is released for the user depending upon the comparison.

For this, a biometric hand scan of the hand or of a finger of the user may be taken by means of a camera of the operator device and be stored as a reference. For this purpose, the maximum number of features—for example, the number of minutiae used for the highest security level—may be detected, for example. This reference may be encrypted and stored on a server, a SIM card, or another storage means.

In a further embodiment of the method, the detected first and/or second identifier is encrypted and compared with the stored (and likewise encrypted) first and/or second identifier serving as a reference.

In a further embodiment of the method, the biometric features are detected by means of the field device. In such an embodiment, for example, a sensor that is integrated into the field device and based upon capacitive, optical, thermal, or ultrasonic technology may be used.

In a further embodiment of the method, the biometric features are detected by means of an operator device, e.g., a hand-held operator device in particular, a smartphone. Nowadays, smartphones in any event comprise corresponding sensors.

In a further embodiment of the method, an application on the operator device is used in order to authenticate and/or to authorize a user via biometric features, in order to make the selected adjustment and/or to execute the selected function. On the one hand, the sensor may be present at the control device; on the other hand, the application that uses these sensor data for the purposes of releasing an invocation of a function or an adjustment of the field device may likewise be executed at the operator device.

In a further embodiment of the method, the user may select or execute settings and/or functions of a specific security level at multiple field devices via the authentication and/or authorization by means of the application at the operator device.

In a further embodiment of the method, a comparison takes place between the detected first and/or second identifier and a first and/or second identifier stored on a server, or between the corresponding encryptions, wherein the server is preferably located on a unit remote from the operator device.

In a further embodiment of the method, the setting and/or function is selected and/or invoked via a first communication connection between the operator device and the field device, wherein at least one part of the detected biometric features is transmitted via a second communication connection between the operator device and the server.

In a further embodiment of the method, the user may select the setting and/or function at the field device via the operator device.

In a further embodiment of the method, biometric features of a single biometric characteristic (fingerprint, DNA, hand geometry, etc.) are detected as a first identifier.

In a further embodiment of the method, a second identifier is detected, wherein the biometric features of a biometric characteristic (fingerprint, DNA, hand geometry, etc.) that are different relative to the first identifier are detected as a second identifier.

With regard to the arrangement, the object is achieved via an arrangement comprising a field device and an operator device, and possibly a server, for implementation of the method according to one of the previous embodiments.

With regard to the computer program product, the object is achieved via a computer program product with program code means that achieve the method when they are executed for implementing the method according to any of the previous embodiments.

BRIEF DESCRIPTION OF THE DRAWINGS

The present disclosure is explained in more detail based upon the following drawings. Illustrated are.

DETAILED DESCRIPTION

Figure 1:
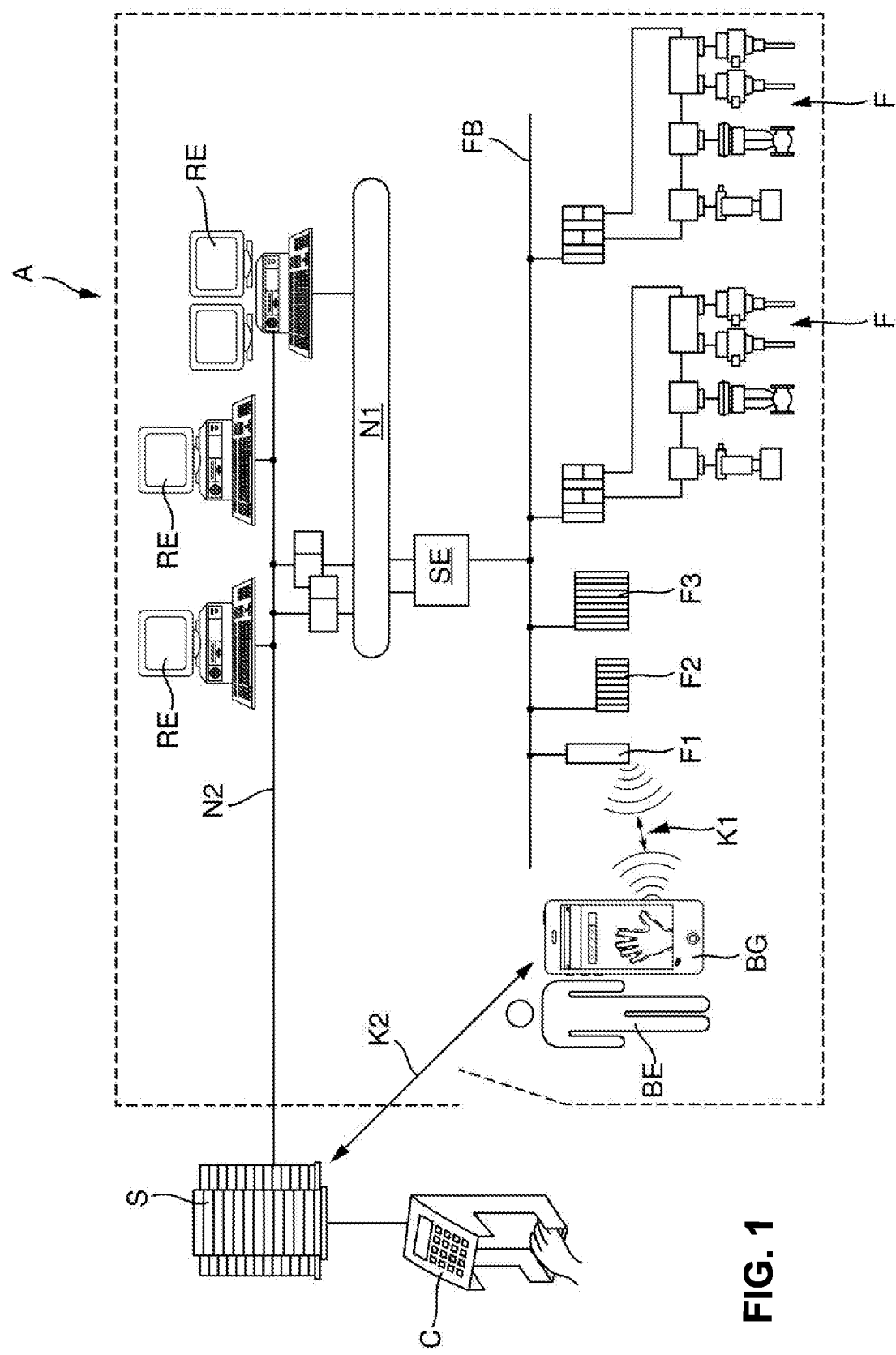
FIG. 1 shows a schematic depiction of an embodiment of the present disclosure, in which a user receives access to a field device in a facility by means of an operator device.

FIG. 1 shows a schematic depiction of a facility with a user BE who, on site at a facility A, wants to gain access to one of the field devices F1 by means of an operator device BG.

For this purpose, under the circumstances, it is first necessary to register the user BE. For this, user BE registers with a server S in order to be able to download an application for his operator device BG. After the successful registration, the user BE receives, for example, an identification code sent from the server S. The user BE can subsequently download the application (commonly referred to as an "app," for example) to his operator device BG.

In order for the application to be functional, the identification code must be specified at least once, e.g., on the operator device BG. After the successful input of the identification code, a security measure is then implemented, for example, in the form of a palm scan. The scan is preferably implemented for the maximum security level, i.e., as many details (minutiae, for example) are read over the duration of the scan as are defined for this security level. An encoding may then be generated from the data of the palm scan by means of an algorithm. The identification code and the encoding of the palm scan (which serves as an identifier) for the maximum security level are stored for the user BE as a reference, for example, on the operator device BG. The information for the authentication, i.e., identification code and the encoding of the palm print, are therefore stored on the operator device BG via the algorithm.

In order to now obtain access to the field device F1, with its settings and/or functions, the user BE starts the application on his operator device BG. For example, all connection-ready field devices F1, F2, F3 are thereby presented to the user BE as a list—what may be referred to as a LiveList. The user BE selects a field device F1 from the list. After the connection selection, the application may open a page on the operator device BG by means of which the user BE may authenticate himself, e.g., by means of one of the proposed security measures. A palm scan (already mentioned above) may be used for this authentication, for example. The palm scan may then be compared with the stored palm scan in order to check the identity of the user BE.

The function or setting for which a person must identify himself may be stored beforehand in the application on the operator device BG and/or the field device F1.

Figure 2:
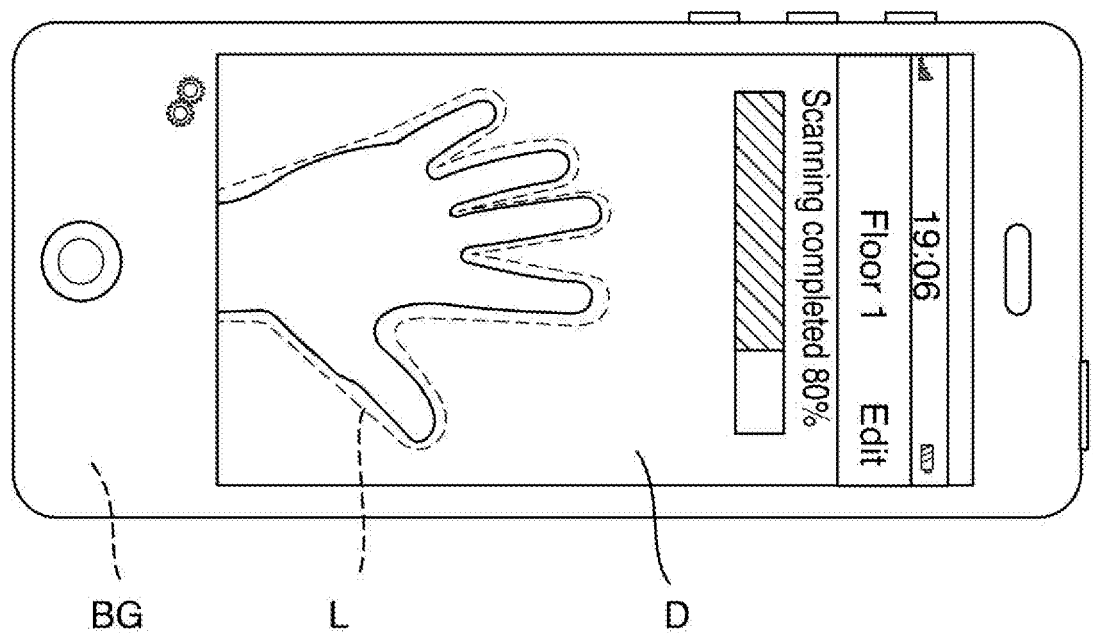
FIG. 2 shows a schematic depiction of an operator device by means of which a detection of biometric features is implemented.

Depending upon the set security level, the user must hold his hand longer or only very briefly in the grid of a display D, which is, for example, in the form of a hand template L, as shown in FIG. 2. With this, security levels may be implemented that require different time periods. The longer that the scan is implemented, the more hand features (for example, minutiae) may be identified.

The application on the operator device BG calculates an encoding for the detected features using the algorithm mentioned. This encoding is compared with the data of the registration process, i.e., the reference determined there.

Given agreement, the application then authenticates the user BE and releases the invoked setting and/or function. The user BE may thus make adjustments to the field device F1 and/or invoke functions. The proposed method may also be used for access authentication to the application itself, such that the at least one security measure is executed before the execution of the application on the operator device BG.

The communication between the field device F1 and the operator device BG (i.e., communication K1), or between the operator device BG and the server S (i.e., communication K2), may thereby preferably be done in an encrypted fashion.

The detected biometric data, e.g., the data of the palm scan, may be sent to the server in the form of an encrypted media stream. The authentication of the user BE is then subsequently implemented at the server S. In addition to this, the connection to the server S may be protected by a firewall.

It is also possible to use speech, not only for the operation of an application, but also for using a speech sample of the user BE for authentication of the user BE.

Embodiments of the present disclosure may also be used to provide a secure facility. In FIG. 1, the dashed line A represents a barrier (a wall or photoelectric barrier, for example) against unauthorized persons or systems.

Every user BE who desires access to the facility in order to modify or check the facility status (for example, field device settings, PCL program, etc.) must first register once via the hand scanner C by inputting his personal identification code, for example, and/or implementing a security measure (in the form of the palm scan, as shown in FIG. 1). The input of the identification code and/or of the palm scan may thereby be observed and documented by an authorized person, in order to guarantee that the identification code may be uniquely associated with the palm scan. This information is stored on the server S together with the authorization data entered for the user for his access rights.

The operation of one of the field devices F1 in the facility A by means of an operator device BG may then take place as follows:

A user BE authenticates himself for the first time outside of the facility by means of a palm scan at the palm reader scanner C and specifies his identification code, which is received from an authorized location for example, a personnel office or a security authority of the facility. The palm scan implemented for the highest security level, i.e., the highest number of palm features at all security levels, is detected.

The access data, in the form of the palm scan and the identification code, are subsequently transmitted from the palm reader scanner C to the server S.

The physical and/or logical access restriction is released, and the now-authenticated user BE receives access to the facility. The authenticated user BE may then establish a connection to a field device F1 for example, via an application on the operator device BG.

The user BE may then select one of the field devices F1 by means of the application on the operator device BG. A palm scan may then take place as a security measure by means of the operator device BG, as depicted in FIG. 2. The features of the current security level (which, for example, are predetermined by the invoked function of the field device and serve as an identifier for the user BE) that are detected by means of the security measure are sent to the server S in the form of a stream, for example. There, the information may be compared with the access data that were detected in the registration, and an authentication algorithm may be implemented.

The user BE may thus be authenticated by the server S. His degree of authorization may likewise be stored on the server S. After an authentication has taken place, the user BE may connect with the field device F1 and implement functions within the scope of the granted authorization.

The palm scan, or the detection of other or additional biometric characteristics, may, alternatively, be implemented, not by the operator device BG or an application thereon, but rather by the field device F1. For example, the field device F1 may have a camera (not shown), and the processing logic for executing the method of the present disclosure may be implemented in the firmware of the field device F1. Alternatively, the processing logic may also be placed on a server S, and the server receives the data detected by means of the camera in the form of a data stream sent from the field device F1, or the field device F1 calculates an encoding of the camera data and transmits this to the server S.

The field device F1 may thereby be connected via a field bus FB with additional field devices F2, F3, F, such as, for example, additional sensors and/or actuators. A control unit that serves to control the process in the facility may be connected to the field bus FB and communicate with the field devices. The control unit SE may in turn be connected with a superordinate first network N1, to which are connected additional computers RE that serve for operation of the facility A. For example, it may be what is known as an engineering station. These computers RE may likewise be connected with one another and with the server S via a superordinate second network N2, which server S serves to authorize and/or authenticate a user BE, for example.

The invention claimed is:

1. A method of operating a field device, the method comprising:
selecting one of a plurality of settings or functions of the field device, the selecting being performed by a user, wherein the plurality of settings or functions of the field device are classified into separate security levels;
executing at least one security measure via an operator device, the security measure depending upon a first security level associated with the selected setting or function, wherein the first security level identifies a first number of features of the security measure to be detected and a second security level identifies a second number of features of the security measure to be detected;
wherein the security measure includes detection of a fingerprint, wherein the first number of features is a first predetermined number of fingerprint features and the second number of features is a second predetermined number of fingerprint features, wherein the second predetermined number of fingerprint features is greater than the first predetermined number of fingerprint features;
determining whether the security measure was executed successfully using the operator device or a server in communication with the operator device, wherein upon determining that the security measure was executed successfully, releasing the field device for the user; and
manipulating one of the settings or invoking one of the functions of the field device, based on the user selection, after the security measure was executed successfully.

2. The method of claim 1, wherein a first number of security measures are executed when a first setting or function belonging to the first security level is selected, wherein a second number of security measures are executed when a second setting or function belonging to the second security level is selected, and wherein the second number exceeds the first number.

3. The method of claim 1, the method further comprising establishing whether the user is in proximity to the field device as a first security measure.

4. The method of claim 1, the method further comprising detecting the first predetermined number of fingerprint features via a first security measure, wherein the first predetermined number of fingerprint features are a first identifier for identifying the user.

5. The method of claim 4, the method further comprising detecting the second predetermined number of fingerprint features via a second security measure, wherein the second predetermined number of fingerprint features are a second identifier for identifying the user.

6. The method of claim 5, wherein whether the selected setting or function is released for the user is further determined using the first or second security measure using the first or second identifier.

7. The method of claim 1, wherein a second security measure is executed instead of a first security measure when the selected setting or function belongs to the second security level that is higher than the first security level, to which belongs at least one other setting or function of the field device.

8. The method of claim 1, wherein a second security measure is executed in addition to a first security measure when the selected setting or function belongs to the second security level that is higher than the first security level, to which belongs at least one other setting or function of the field device.

9. The method of claim 5, wherein whether the selected setting or function is released for the user is further determined based on a comparison of the detected first or second identifier stored as a reference in the field device, a server or the operator device.

10. The method of claim 9, the method further comprising authenticating or authorizing the user via the first or second predetermined number of fingerprint features to make an adjustment to a selected setting or to execute a selected function using an application on the operator device.

11. The method of claim 10, the method further comprising, after authenticating or authorizing the user, enabling the user to select or execute the selected settings or functions of a specific security level on multiple field devices.

12. The method of claim 10, wherein the comparison is between the detected first or second identifier and a first or second identifier stored on a server, or between corresponding encryptions, where the server is located on a unit remote from the operator device and the application on the operator device is a client.

13. The method of claim 9, wherein the selected setting or function is selected via a first communication connection between the operator device and the field device, and wherein at least one part of the detected fingerprint features is transmitted via a second communication connection between the operator device and the server.

14. A system for operating a field device comprising:
the field device having a plurality of settings or functions of the field device, wherein the plurality of settings or functions of the field device are classified into separate security levels and are selectable by a user;
an operator device operable by the user, wherein the field device and the operator device are configured to cooperatively enable the user to select one of the plurality of settings or functions of the field device, to execute at least one security measure via the operator device, the at least one security measure depending upon a first security level associated with the selected setting or function and to determine whether the security measure was executed successfully using the operator device or a server in communication with the operator device, wherein upon determining that the security measure was executed successfully, releasing the field device for the user;
wherein the first security level identifies a first number of features of the security measure to be detected and a second security level identifies a second number of features of the security measure to be detected;
wherein the security measure includes detection of a fingerprint, wherein the first number of features is a first predetermined number of fingerprint features and the second number of features is a second predetermined number of fingerprint features, wherein the second predetermined number of fingerprint features is greater than the first predetermined number of fingerprint features; and a device configured to manipulate one of the settings or invoke one of the functions of the field device, based on the user selection, after the security measure was executed successfully.

15. The system of claim 14, the system further comprising a server, the server configured to enable the user, cooperatively with the field device and the operator device, to select one of the plurality of settings or functions of the field device, to execute the at least one security measure, the at least one security measure depending upon a security level associated with the selected setting or function, and to determine whether the security measure was executed successfully, wherein upon determining that the security measure was executed successfully, releasing the field device for the user.

16. A non-transitory computer readable medium storing a program causing a computer to execute a process, the process comprising:

receiving from a user a selection of one of a plurality of settings or functions of the field device, wherein the plurality of settings or functions of the field device are classified into separate security levels;

executing at least one security measure via an operator device, the at least one security measure depending upon a first security level associated with the selected setting or function, wherein the first security level identifies a first number of features of the security measure to be detected and a second security level identifies a second number of features of the security measure to be detected;

wherein the security measure includes detection of a fingerprint, wherein the first number of features is a first predetermined number of fingerprint features and the second number of features is a second predetermined number of fingerprint features, wherein the second predetermined number of fingerprint features is greater than the first predetermined number of fingerprint features;

determining whether the security measure was executed successfully using the operator device or a server in communication with the operator device, wherein upon determining that the security measure was executed successfully, releasing the field device for the user; and manipulating one of the settings or invoking one of the functions of the field device, based on the user selection, after the security measure was executed successfully.

* * * * *